Sept. 1, 1959     K. KÖRBER ET AL     2,902,040
METHOD AND MACHINE FOR MANUFACTURING FILTER
MOUTH PIECE CIGARETTES
Original Filed Dec. 8, 1953     5 Sheets-Sheet 4
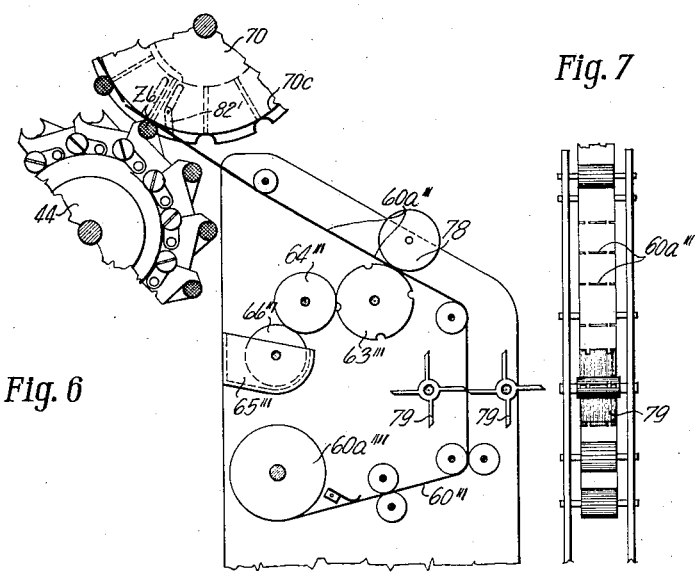
Fig. 6
Fig. 7
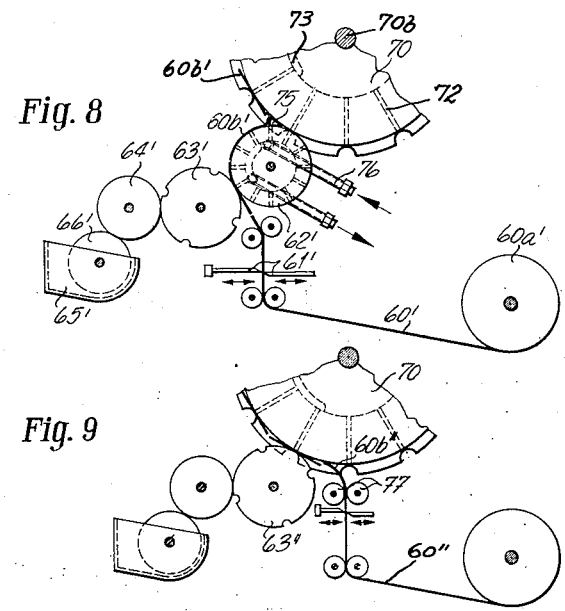
Fig. 8
Fig. 9
INVENTORS
Kurt Körber, Bernhard Schubert
& Carl Stelzer
BY
Singer, Stern & Carlberg,
Attorneys.

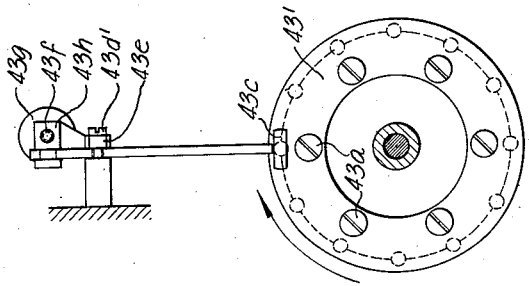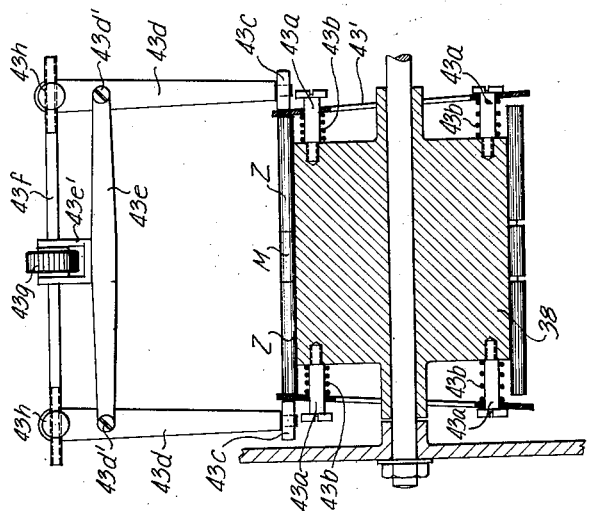

United States Patent Office 2,902,040
Patented Sept. 1, 1959

2,902,040

METHOD AND MACHINE FOR MANUFACTURING FILTER MOUTH PIECE CIGARETTES

Kurt Körber, Hamburg-Bergedorf, Bernhard Schubert, Hamburg-Sasel, and Carl Stelzer, Hamburg-Bergedorf, Germany Original application December 8, 1953, Serial No. 396,824. Divided and this application May 26, 1958, Serial No. 737,970

16 Claims. (Cl. 131—94)

The invention relates to the manufacture of cigarettes and is particularly directed to improvements in the manufacture of filter mouth piece cigarettes by uniting cigarettes arranged in spaced axial alignment with a piece of filter rod positioned in the space between the cigarettes in axial alignment with the latter and then, after the cigarettes have been brought into abutting relation with the piece of filter rod, there is wrapped an external uniting band of paper, cork, or the like, around the piece of filter rod and the adjacent ends of the cigarettes, whereupon the piece of filter rod is cut in its center to form cigarettes, each having a filter mouth piece attached thereto.

The invention is a division of United States patent application, Serial 396,824, filed on December 8, 1953, now abandoned.

The invention has as one of its objects to provide a machine for making filter mouth piece cigarettes in which the machine is provided with means for arranging the cigarettes in axial alignment with the prepared filter rod piece and by providing rotary drums with axially extending grooves in their circumferences for receiving the cigarette filter rod assemblages and holding the same thereon for the required length of time until transferred to the next drum by succession or mechanical devices. It is also an object of the invention to provide a machine as referred to in the foregoing with a supply device for a continuous band from which the individual uniting bands are cut, one after the other as needed and supplied to one of said drums which has already received a cigarette-filter rod assemblage or to which the cigarette-filter rod assemblage is transferred after the uniting band has been supplied thereto. A device is also provided which applies a coating of a suitable adhesive to one side of the continuous band or to the individual uniting band after the latter has been severed from the continuous band and has been transferred to one of the rotating drums of the machine.

Still another object of the invention is a device for cutting predetermined lengths of filter rods in a number of pieces of substantially uniform length and in which the last piece, which may slightly differ in length from the preceding pieces cut from the same filter rod is being transferred to a pair of axially aligned and spaced cigarettes without having its length modified, whereby the next length of filter rod being cut into pieces in the same manner as the preceding length, thereby avoiding the disadvantage that any errors in length in the cut pieces of filter rods will accumulate which would render some subsequently cut filter rod pieces unsuitable for use.

With these and other objects in view, the invention is hereinafter described by way of example with reference to the accompanying diagrammatic drawings in which—

Fig. 4 is a horizontal sectional view along the line E—F of Fig. 2.

Fig. 6 illustrates by way of example a device in side elevation view for feeding an adhesive coated band into the machine.

Fig. 7 shows an end view of a portion of the band feeding device as shown in Fig. 6.

Fig. 8 illustrates in side elevation view another device for feeding an adhesive coated band into the machine.

Fig. 9 shows in side elevation view still another modification of feeding a continuous band from which individual uniting bands are cut into the machine.

Fig. 10 illustrates a sectional view of a device for axially pushing the cigarettes and the filter mouth pieces together, and Fig. 11 is an end view of the device as shown in Fig. 10.

Figure 1:
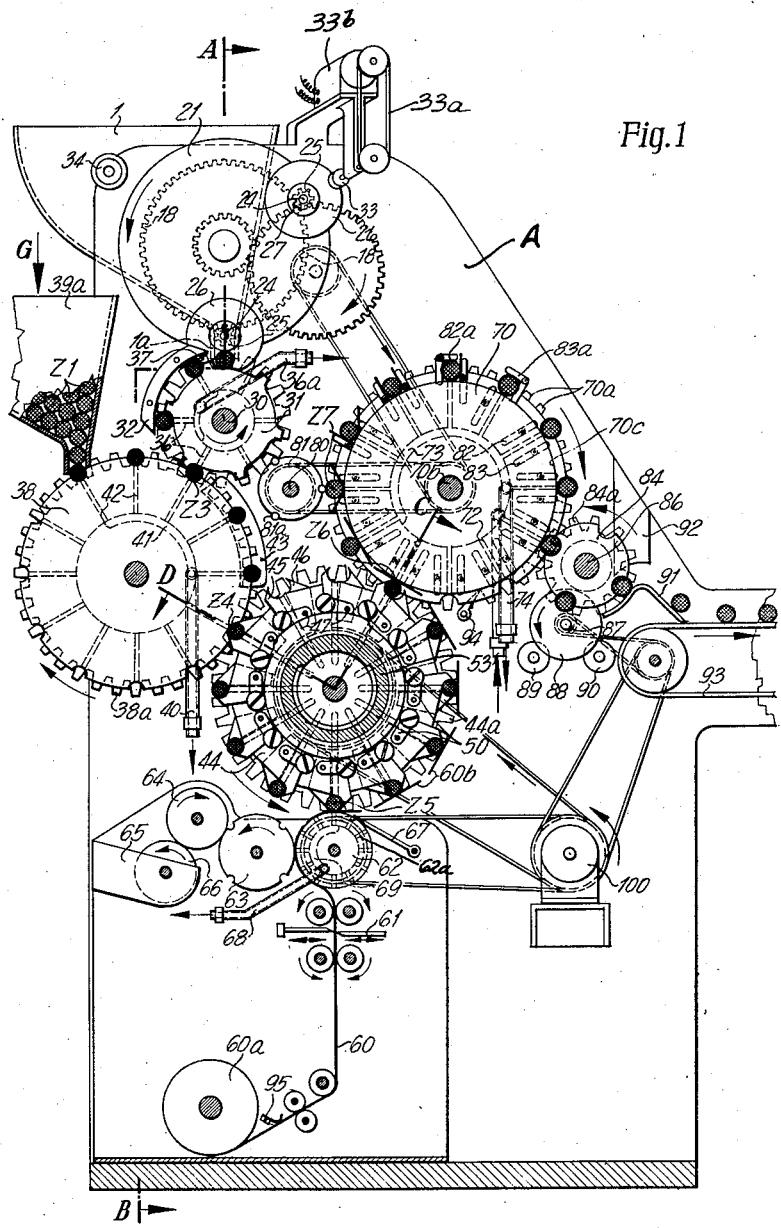
Fig. 1 is a side elevation view of the machine partly in section.
Figure 2:
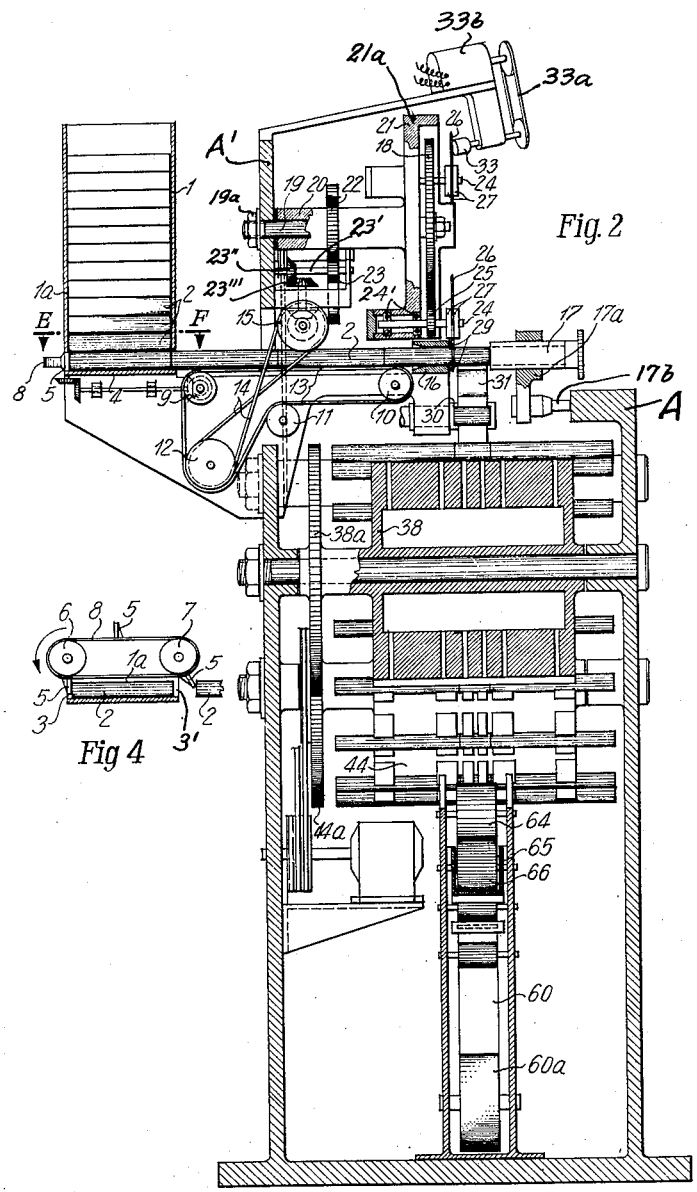
Fig. 2 is a sectional view along the line A—B of Fig. 1.

Referring to Figs. 1, 2 and 4, the magazine 1, which has the shape of a hopper and has a reduced lower end 1a for discharging one filter rod piece at a time, receives a supply of filter rod pieces 2, which, by way of example, may have each a length six times the length of a conventional filter mouth piece attached to a cigarette. These filter rods 2 are discharged lengthwise from the lower channel-shaped end 1a of the magazine 1 and are received by a horizontal plate 4 and are removed from the latter by lugs 5 which, for example, are attached to an endless link belt 8 moving over rollers 6 and 7. The lugs 5 on the link belt 8 transfer the filter rods 2 to the upper horizontal run of a continuously moving endless conveyor belt 13, which is trained over the rollers 9, 10, 11 and 12 (Fig. 2). For the purpose of permitting the lugs 5 on the belt 8 to engage the rear end of the lowermost filter rod 2 in the lower end of the magazine, the latter is provided with recesses 3 and 3' (Fig. 4) for the entrance and the egress of the lugs 5. The surface of the supporting plate 4 and that of the upper run of the endless conveyor belt 13 are preferably arranged at the same elevation. The roller 12 drives by means of a crossed endless belt 14 and an additional conveyor device 15, which may consist of a plurality of rollers, a belt, steel tape, or the like, which move in the same direction as the upper run of the conveyor belt 13. The conveyor device 15 is arranged in spaced relation above the conveyor belt 13 and is positioned in such a manner that it urges the lengthwise moving filter rods 2 against the conveyor belt 13.

The filter rods 2 are moved lengthwise by the combined action of the conveyor device 13 and 15 into a stationary cutting tube 16 (Fig. 2), and are moved through this tube until the front end of the rods 2 abut one end of an adjustable screw 17, which is arranged as shown in Fig. 2 in axial alignment with the filter rod in a pivotally mounted lever 17a, which is pivotally mounted about the axis 17b in the machine frame A.

The machine frame A supports above the mentioned cutting tube 16 the sun gear 18 of a planetary gear ring on a stationary shaft 19 which is bolted as indicated at 19a to a part A' of the machine frame. The shaft 19 is also used for rotatably supporting a sleeve 20, one end of which is integrally formed with a radial flange 21 at the circumference of which is arranged an axial flange 21a. Furthermore, the sleeve 20 has attached to it between its ends a gear 22 which is in engagement with a gear 23 on a shaft 23' driven by means of a bevel gearing 23", 23''' from the conveyor device 15. The sleeve 20 is driven counterclockwise when viewed in Fig. 1. The radial flange 21 carries near its circumference in suitably mounted bearings 24' two rotatable shafts 24 which are displaced about an angle of about 120° (Fig. 1) and carry at the outer ends a circular knife 26 secured thereon by means of clamping plates 27. The knives 26 are arranged to engage always the front end 29 of the cutting tube 16 when the knives are moved one at a time into cutting position. Each of the shafts 24 is provided between its ends with a planetary gear 25 meshing with the stationary sun gear 18, and it will be noted that upon rotation of the sleeve 20, the shafts 24 are moved bodily in a circular path and at the same time rotate about their own axes to rotate the circular cutting knives 26 while moving the same past the end of the cutting tube 16.

A shaft 30 which is rotatably supported in the machine frame A (Fig. 1) supports a drum 31 with axial grooves for receiving and transporting the filter rod pieces cut from the filter rods 2. The drum 31 is preferably rotated continuously and the grooves are made sufficiently long to receive the filter rod pieces which are held in the grooves by suction. For this purpose, the rear ends of the grooves are in communication with radial suction passages 36 which, in turn, are connected to a suction line 36a. A portion of the circumference of the drum is surrounded in spaced relation by a cover plate 32 which assists the movement of the filter rod pieces until they are transferred to another drum 38.

The machine frame A has also mounted thereon a cuplike grinding member 33 on a shaft continuously driven by an endless drive belt 33a from an electric motor 33b. Another grinding element 34 is preferably fixedly mounted on the machine frame as shown in Fig. 1 and serves principally for removing any burrs from the circular cutting knives 26 which burrs may be formed thereon by the rotating grinding member 33.

The operation of the filter rod cutting device is as follows: The filter rods 2 move from the magazine 1 into the vertical reduced portion 1a and from here are placed upon the supporting plate 4. The lugs 5 on the endless conveyor belt 8 engage the lowermost filter rod 2 and transfer it to the conveyor belt 13. The speed of the conveyor belt 13 is somewhat greater than the speed of the lugs 5 so that the filter rods are always safely removed from the range of the lugs 5. In order to assure a positive movement of the filter rods 2, the invention provides the counter roller 15, which exerts a pressure to the filter rods in such a manner that at the time the circular knife 26 engages a filter rod, the latter is momentarily brought to a stop which means, of course, that there occurs some slippage between the conveyor belt 13 and the filter rod, and between the roller 15 and the filter rod, respectively.

The conveyor belt 13 moves the filter rods through the stationary cutting tube 16 and into a groove of the drum 31 until the outermost or front end of the filter rod engages the left hand end of the adjusting screw 17, whereupon one of the two circular knives 26, as shown in Fig. 2 cuts the filter rod in two leaving a filter rod piece of the desired length in the groove of the drum 31. The filter rod piece cut from the filter rod 2 is now moved laterally (counterclockwise in Fig. 1) away from the cutting device by the rotating drum 31, and is transported and transferred to the other drum 38. At the same time the portion of the filter rod remaining in the cutting tube 16 is advanced until it engages the end of the screw 17 and now the remaining portion of the filter rod is cut by the second circular knife 26 which is displaced 120° away from the first circular cutting knife. The second filter rod piece cut from the remaining filter rod piece is deposited in the next groove of the drum 31 and is likewise laterally moved away from the cutting tube 16 by the drum 31. Now the last remaining portion of the filter rod 2 is moved in engagement with the screw 17 and a new filter rod is moved in engagement with the last remaining portion of the preceding filter rod. In this particular case there takes place, according to the invention, no cutting operation of the remaining filter rod piece because the planetary gearing has no knife along the following 240° of the circumference of the radial flange 20. If, therefore, the last mentioned portion of the filter rod has a somewhat different length, this difference in length will not be transferred or added to the following filter rods, and when the new filter rod or the second filter rod moves up to the screw 17, the remaining last portion of the filter rod is transferred uncut to the drum 31. Thereupon the cutting operation starts anew on the next filter rod and the length of the filter rod pieces will, therefore, be always correct with the possible exception of the last, or the third filter rod piece in the present example which may have a length somewhat different from the two preceding filter rod pieces.

The invention is not limited to a cutting device employing only two rotary knives 26 which are angularly displaced about a distance of 120°, nor to the use of filter rods having a length which is six times the normal length of a filter mouth piece for a cigarette. It is, for instance, also possible to employ filter rods having a length eight times as long as a standard filter mouth piece and in such a case the radial flanges of the planetary gearing would be provided with three circular knives 26 which are angularly displaced about a distance of 90°, whereby between the third knife and the first knife an angular distance of 180° would be provided.

In case there should develop any difficulties in the advance of the filter rods into the grooves of the rotary drum 31, it would be possible to laterally rotate the lever 17a which carries the adjustable abutment screw 17 and then remove the difficulty. In order to prevent, after cutting of the filter rod pieces, an inclined disposition of the filter rod pieces in the grooves of the continuously rotating drum 31, there is provided below the cover plate 32 a resilient element 37 such as a resilient roller or the like (Fig. 1) which engages slightly the end of the filter rod piece and urges this end of the filter rod against the rotary drum 31.

The rotary drum 31 has a width which is equal to the length of the piece of filter rod that has been cut off. The length of the cut off portion of the filter rod is now twice the length of the filter rod piece on each cigarette. However, the next rotary drum 38 must be of a width which is equal to the length of two cigarettes and the filter mouth piece arranged in alignment between these two cigarettes.

Figure 5:
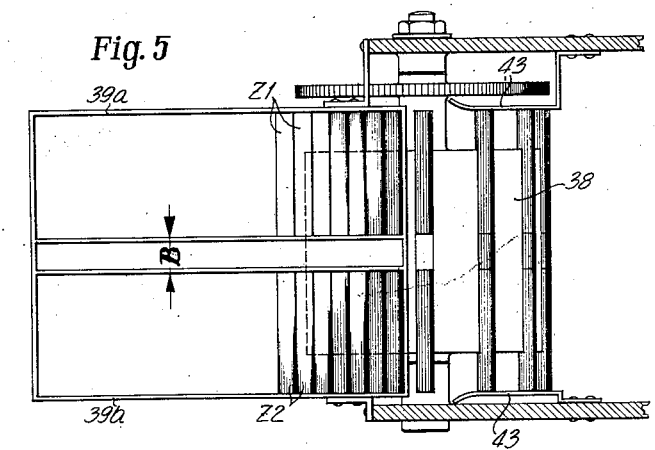
Fig. 5 is a top plan view of a portion of the machine viewed in the direction of the arrow G in Fig. 1.

The cigarettes to be provided with a filter mouth piece are placed in a double magazine 33a and 33b and are transferred from the latter to the rotary drum 38, which also is provided with axial grooves on its circumference for receiving the cigarettes indicated in Fig. 5 with Z1 and Z2. The two halves of the magazine 39a and 39b are arranged parallel to each other and are spaced from each other a distance B (Fig. 5) and this distance B corresponds to the length of the filter rod piece which is placed between each pair of axially aligned cigarettes received from the mentioned double magazine. The cigarettes Z1 and Z2 which are being placed into the grooves of the drum 38 are held in these grooves by means of suction. For this purpose, the drum 38 is provided with radial suction passages 42 connecting the grooves on the circumference of the drum with a suction conduit 41 in the interior of the drum, from where a suction line 40 leads to the outside of the machine to be connected to a suitable source of suction. At the position Z3 (Fig. 1) of the drum 38 there is inserted between each two axially spaced and aligned cigarettes a filter rod piece which is supplied by the grooved drum 31. These filter rod pieces are held in position on the drum 38 by suction. The two cigarettes are then pushed lengthwise toward each other in engagement with the opposed ends of the filter rod piece by means of guide plates 43 (Fig. 5) and then the assemblage consisting of the two cigarettes and the filter rod piece therebetween is transferred at Z4 (Fig. 1) to a drum 44.

In the embodiment of Fig. 5, the guide plates 43 are fixedly arranged. The result is that the cigarettes slide along these fixedly mounted guide plates 43 which causes a certain amount of friction. It may happen that in view of this friction the cigarettes are somewhat distorted and are squeezed from the grooves on the drum. The guide plates 43 may also become somewhat soiled, particularly when the tobacco used in making the cigarettes is heavily juiced, and it may even happen that the cigarettes are being bent and that the ends of the same breaks off.

This undesirable action of the stationary guide plates 43 may be avoided when a modified arrangement of guide plates is employed as shown in Figs. 10 and 11. In this modification of the invention, the guide plates 43' rotate with the drum 38. According to Fig. 10, the guide plates 43' have the form of annular discs concentrically arranged on the right hand and left hand ends of the drum 38. These annular discs 43' are held in position on the drum by a plurality of headed screws 43a which are secured in the end walls of the drum 38. Between the end walls of the drum and the guide plates 43' there are arranged helical springs 43b which preferably as shown are placed on the shaft of the screws 43a and have the result that the guide plates 43' are continuously urged outwardly. Furthermore, at the transfer point Z4 there is arranged a roller 43c which urges the guide plate 43' inwardly, or toward the adjacent end wall of the drum. The rollers 43c are mounted rotatably at the ends of lever arms 43d which, in turn, are rotatably attached to the ends of a bar 43e forming a portion of the machine frame A. The bar 43e is provided between its ends with a U-shaped bearing block 43e' for rotatably supporting a shaft 43f which has secured thereto a knurled knob 43g which is arranged within the bearing block 43e'. The ends of the shaft 43f are provided with threads and one thread is left-handed and the other is right-handed and carry correspondingly threaded blocks 43h on which the lever arms 43d are attached. Upon rotation of the knurled knob 43g, the lever arms 43d swing about their pivot axis 43d' which, in turn, results in an adjustment of the position of the guide plates 43' with respect to the end walls of the drum 38. As shown in Fig. 10, the uppermost groove of the drum 38 contains an assemblage of two cigarettes Z and between the same a filter rod piece M. These parts are axially moved together by the guide plates 43' which are engaged by the rollers 43c. In the lower portion of the drum 38, the two cigarettes are shown as being still axially spaced from the filter rod piece therebetween.

The drum 38 and also the drum 44 are provided adjacent one end thereof with a gear 38a and 44a, respectively, as shown in Fig. 2, and these two gears are in engagement with each other. When an assemblage of two cigarettes and a filter rod piece therebetween is transferred from the drum 38 to the drum 44, the center axis of this assemblage is positioned on a circle which has the same diameter as the pitch circle of the gears 38a and 44a, respectively, which are mounted co-axially with respect to the corresponding drums 38 and 44, respectively.

Figure 3:
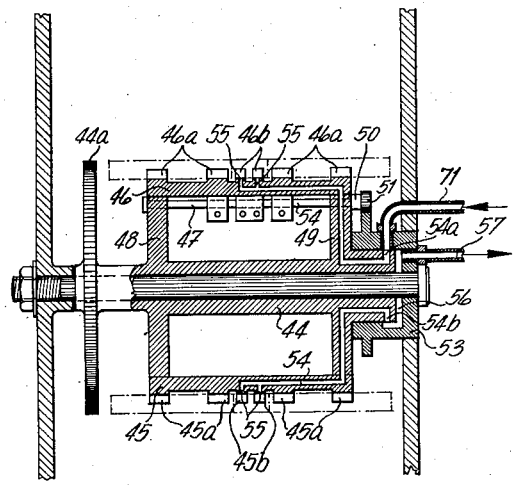
Fig. 3 is a vertical sectional view along the line C—D of Fig. 1.

The grooves provided on the drum 44 are preferably semicircular in shape and in accordance with the present invention are formed by gripper jaws 45 and 46. The gripper jaws 45 are fixedly secured to the drum 44, but the gripper jaws 46 are pivotally mounted on the drum by means of shafts 47 which are rotatably supported in the end walls 48 and 49 of the drum (Fig. 3). Each shaft 47 has fixedly secured thereto at one end which projects outside of the drum, a lever 50 which carries a roller 51 engaging a cam 53, preferably having the form of a cam disc, and which is fixedly secured in the machine frame A. Therefore, when the drum 44 rotates, the gripper jaws 46 are caused to move with respect to the fixed gripper jaws 45 into an open and closed position.

In this embodiment of the drum 44, the two cigarettes, which are transferred to the drum, are solely held in position by the gripper jaws 45 and 46, but the filter rod piece between each pair of cigarettes is held in position not only by these gripper jaws 45 and 46 but in addition thereto also by suction. The suction is exerted upon the filter rod pieces by suction apertures 55 which communicate with suction conduits 54, which, in turn, communicate with a suction chamber 56. The latter is connected by means of a line 57 with an exteriorly arranged source of suction. The suction chamber 56 in the mentioned embodiment of the invention is arranged in the stationary cam disc 53.

The gripper jaws 45 and 46 are shaped in such a manner that in their closed position they form preferably a semicircular groove, the center axis of which is in axial alignment with the center axis of the filter rod piece and also lies on the circumference of the pitch circle of the co-axially arranged gear 44a. In order that the cigarettes may be seized without difficulty, the outer ends 45a and 46a of the gripper jaws 45 and 46, respectively, extend beyond the center of the cigarettes, as shown in Fig. 3, or—in other words—they extend beyond the largest diameter of the cigarettes. In order to seize the filter rod piece which is positioned between two axially aligned cigarettes, the ends 45b and 46b, respectively, are preferably made small and are made somewhat shorter in order that they do not become soiled by the adhesive with which the uniting bands are provided, which, as will be explained later, are employed for uniting the filter rod piece with the adjacent ends of the cigarettes. The described shape of the gripper jaws 45 and 46 has the advantage that in particular oval-shaped cigarettes are reshaped to a circular cross section so that the so reshaped circular cigarettes can be united conveniently with the filter rod pieces having a similar circular cross section, whereby the uniting band will be applied uniformly and without difficulty around the parts to be united with each other.

The wrapping of the uniting bands will now be described in more detail. Below the drum 44 is arranged a device for feeding the uniting bands into the machine and for cutting the uniting bands to a length which corresponds to the circumference of the cigarettes. Also provided is a device for applying an adhesive to the uniting bands before they reach the drum 44.

A continuous band 60 from which the individual uniting bands are cut, is unwound from a supply spool 60a mounted rotatably in the lower part of the machine frame A. The band 60 is suitably guided by means of a plurality of rollers and is then cut into the desired length by a cutting device 61. Immediately after cutting, the individual bands 60b are fed on to the circumference of a suction drum 62 and are supplied with an adhesive by a roller 63 which engages the uniting bands 60b while on the drum 62. The adhesive applying roller 63 is engaged by an adhesive distributing roller 64 which, in turn, is supplied with an adhesive by a roller 66 partly immersed in an adhesive container 65.

The uniting bands 60b, which are supplied in the described manner with an adhesive, may consist of paper, cork, or the like, and are transferred from the roller 62 to the assemblage consisting of two cigarettes and a filter rod piece therebetween carried by the drum 44. The uniting bands 60b are sufficiently wide to cover the entire length of the filter rod piece and the adjacent ends of two cigarettes. In case one of the grooves of the drum 44 should not contain an assemblage, then the adhesive coated uniting band 60b will not be transferred to the drum 44 but will be removed from the suction drum 62 by a scraper 67. The suction drum 62 is provided with radial passages 62a extending to the circumference of the drum 62 and communicating with a suction conduit 69 within the drum from which a suction line 68 extends outwardly to be connected with a suitable source of suction.

The transfer of the adhesive coated uniting bands 60b to the assemblage on the drum 44 takes place at the point Z5, and from hereon the uniting bands are moved counterclockwise to the transfer point Z6 at the drum 70. The uniting bands 60b, during this travel from point Z5 to Z6, are adhering only along a relatively narrow zone to the mentioned assemblage consisting of cigarettes and a filter rod piece, and are substantially arranged flat except that owing to the adhesive on one side thereof, the uniting bands 60b have a slight tendency to curl toward the circumference of the assemblage.

According to the invention, it is also possible to convey the uniting bands 60b directly to the drum 70 without the use of the drum 44. This embodiment of applying the uniting bands 60b is illustrated by way of example in Figs. 8 and 9. As shown, the drum 70, which will be described in more detail later, is provided on its circumference with grooves and according to Fig. 1 has attached thereto a gear 70a which meshes with the gear 44a on the drum 44. The grooves on the circumference of the drum 70 during the rotation of the latter are brought into communication with a suction conduit 73 by means of radially arranged suction passages 72. The suction conduit 73 is in communication with a suction line 74 leading to the outside source of suction. According to Fig. 8, a continuous band 60' is unwound from a spool 60a' and is cut into the desired lengths by a cutting device 16', and the individual uniting bands, after having received on one side a coat of adhesive from the roller 63', are conveyed by means of the suction roller 62' to the drum 70 which rotates about an axis 70b. The coating roller 63' is engaged by a distributing roller 64' which, in turn, receives the adhesive from a roller 66' partly immersed in an adhesive container 65'.

The uniting bands 60b' are conveyed preferably by a stationary guide member 75 (Fig. 8) which with its lower end extends into annular grooves of the suction drum 62 onto the suction roller 70. The removal of the uniting bands from the suction roller 62' may be assisted, if desired, by compressed air, which may be supplied by a line 76. The uniting bands 60b' are now taken over by the drum 70 and are held thereon by suction and are moved to the transfer point Z6 (Fig. 1) at which point the assemblage of two cigarettes and a filter rod piece is transferred to the drum 70 by the drum 44. The transfer takes place in such a manner that the assemblage is positioned upon the adhesive coated surface of a uniting band. The transfer surface of the uniting bands on the drum 70 is preferably maintained flat so that a safe and secure transfer of the assemblage thereon may take place.

In Fig. 9 is illustrated a somewhat different manner of transferring the uniting bands to the suction drum 70 because in this embodiment the uniting bands 60b" after being cut from the continuous band 60" are not provided with an adhesive until such time that they have been received by the drum 70. Only after the uniting bands 60b" have been received by the suction drum 70, are they provided with a coating of adhesive by an adhesive transfer roller 63", which at the same time urges the uniting bands 60b" in engagement with the surface of the drum 70.

It will be noted that in all described embodiments the uniting bands, when conveyed in engagement with the cigarette and filter rod assemblage, are severed from a continuous band which is not provided with an adhesive. It may happen, therefore, that some of the uniting bands fall off before they reach the assemblage or may be placed irregularly and, therefore, the present invention provides also a modification according to which the uniting band may be supplied to the transfer point Z6 without being severed into individual bands. For this purpose, the continuous band is perforated in suitable distances, or is creased, or is partly cut, or otherwise weakened so that it may be provided continuously with an adhesive in order to be severed from the continuous band immediately before the transfer point Z6 along the weakened points.

A band supply device of this mentioned type is diagrammatically illustrated in Figs. 6 and 7. In this modification also there is arranged below the drums 44 and 70 an adhesive applying device consisting of an adhesive container 65''', a roller 66''' partly immersed in the adhesive, a distributing roller 64''', an adhesive applying roller 63''', and a counter roller 78, between the latter of which and the roller 63''' the band to be provided with an adhesive is passed. The continuous band 60''' is taken from a spool 60a'''' and in this particular case the band is provided with perforations along the separating lines 60a''' (Fig. 7). The separating lines 60a''' are spaced from each other a suitable distance which is determined by the circumference of the cigarette filter rod piece assemblages to be united by means of an individual uniting band. The perforations may, for instance, be of such a nature that they can hardly be noticed by the eye. The perforations may be produced, for instance, by a pair of perforating rollers 79 or by another perforation producing device of conventional construction which is positioned below the adhesive applying device. The perforation producing device may consist of a roller and a counter roller, or of a roller and a counter plate, or the like. Furthermore, the band 60''' may also be provided with perforations before it is wound upon the spool 60a''' so that when the spool 60a''' is unwound, there are already the desired perforations in the band 60'''. The perforations may, for instance, have the shape and arrangement as shown in Fig. 7 in which the perforations consist of two small incisions in the marginal portions of the band and of a single longer slit in the center of the band. When the band in a manner described hereinafter is bent to be severed so as to produce individual uniting bands, there takes place a very easy separation from the main body of the band along the line of the perforation. Since the individual uniting bands are completely covered on one face thereof with an adhesive, it should be clear that also the end portion of the uniting bands, after their separation from the main body of the continuous band are completely covered with an adhesive and assure a complete adherence of the same to a cigarette-filter rod piece assemblage.

According to the Figs. 6 and 7, the band 60''' is directly conducted to the transfer point Z6 between the drums 44 and 70 in such a manner that the side of the band 60''', which does not have adhesive thereon, engages supporting bars 70c of the drum 70 and is held thereon by suction, while the other side of the band 63''', which had the adhesive applied thereto will receive the cigarette-filter rod piece assemblage at the transfer point Z6.

It is, however, not absolutely necessary that the band is directly conducted to the transfer point Z6, as shown in Figs. 6 and 7. It is also possible to feed the band 60''' in a manner as shown in connection with the band 60, as shown in Fig. 1. In such a case, the band 60''' would be first fed to the drum 44 and would be conveyed in individual portions 60b toward the transfer point Z6. It is also possible to feed the band in a manner as shown in connection with the Figs. 8 or 9, in which case the band engages the drum 70 before the individual uniting bands reach the transfer point Z6.

Assuming that the severed uniting bands or the continuous band is conducted to the transfer point Z6, according to Fig. 1, by means of the drum 44, then after the transfer point Z6 has been reached, the ends 54a (Fig. 3) of the suction passages 54 are separated from the suction chamber 56 until a new assemblage has been received and the gripper jaws 45 and 46 are opened in order to transfer the assemblage with the uniting band 60b to the drum 70. For facilitating the transfer of the assemblage to the drum 70, the invention provides that in this particular position a stream of compressed air is admitted into a pipe line 71 which at this particular point is arranged opposite the opening 54b in the cam body 53, so that by means of the opening 54a compressed air enters the passage 54. The compressed air conducted into the pipe line 71 is received from a not disclosed source which may consist of a blower of conventional construction. The compressed air is discharged from the openings 55 which preferably are arranged opposite the center of the filter rod pieces so that the same do not adhere in the groove-like recesses formed between the opened gripper jaws 45 and 46.

After the cigarette-filter rod piece assemblages on one hand, and the adhesive coated uniting bands on the other hand, have been transported to the transfer point Z6 and have been deposited on the surface of the drum 70, the uniting band is wrapped around the joints between the cigarettes and the filter rod pieces.

The rotating drum 70 conveys the mentioned assemblages together with the uniting bands—first, to the point Z7, at which point is arranged a counter drum 81 with circular rods 81a on its circumference, which latter during the rotation of the drum 70 about its axis 80 engage the cigarette-filter rod piece assemblages. The wrapping operation takes place by means of stationary cam discs which are not shown, but which act upon radially movable bars 82 and 83, carried by the drum 70 and provided at their outer ends with hinged members 82a and 83b, respectively, which engage the outer ends of the uniting bands 60b and press the same against the circumference of the assemblage.

The manner in which the uniting bands 60b are wrapped around the cigarette rod piece assemblages is not of particular importance for the present invention, but it is desired to explain that the radially movable bars 82 and 83 which extend lengthwise of the circumference of the drum 70 produce a curvature in the uniting band at the point Z7 and thereafter during the rotation of the drum 70, the two hinged members 82a and 83a, respectively, fold the ends of the uniting bands around the assemblage; first, the hinged member 82a performs its function and thereafter the hinged member 83a and after that the uniting band is completely wrapped around the cigarette-filter rod piece assemblage. The counter rods 81a at the transfer point Z7 are used in addition to the suction to press the uniting band and the cigarette-filter rod piece assemblage against the flat supporting bars 70c of the drum 70.

When according to the Figs. 6 and 7 the band 60''' has been moved to the transfer point Z6, then the radially movable bars 82 are suitably used for separating the uniting band from the body of the continuous band, and this takes place while the bar 82' performs its radial outward movement, as shown in Fig. 6, so that in view of the tensioned band 60''' the same is separated along the perforated line 60a''', as shown in Fig. 7.

After the uniting band has been applied to the circumference of the drum 70 and has been wrapped around the cigarette-filter rod assemblage, the finished assemblages are transferred to the grooves of a drum 84 which rotates about an axis 86 and is driven by a gear 84a which meshes with a gear 70a on the drum 70. Below the drum 84 is arranged a circular knife 88 which rotates about an axis 87 and projects into a slot in the center of the drum 84. The assemblages transferred to the drum 84 are moved counterclockwise and are held in the grooves of the drum 84 by suction. While they are held in this manner, the circular knife 88 cuts the filter rod piece in the cigarette assemblage in two parts of uniform length. Below the circular knife 66, there are also arranged two grinding discs 89 and 90 for sharpening the knife 88.

The separated assemblages constituting completed filter rod piece cigarettes are conducted along suitably shaped guide plates 91 and 92 along an inclined path downwardly and onto an endless conveyor belt 93, which conveys the two groups of finished cigarettes outwardly of the machine for further handling, such as packaging or the like.

If any filter rod pieces or entire assemblages are not properly transferred to the drum 84 for any reason whatsoever, and, therefore, would remain on the drum 70, then these filter rod pieces or assemblages are stripped from the drum 70 by one or more scrapers 94 before the drum 70 again reaches the transfer point Z6.

As shown in the lower portion of Fig. 1, there is arranged in connection with the band supply device an electrical contact 95 which is normally in engagement with the band 60 taken from the spool 60a, but if the band should break or should be exhausted from the spool 60a, then the electrical contact 95 moves into a position in which the electrical circuit energizing the machine is opened so that the entire machine is rendered inoperative and stops. This has the advantage that the adhesive applying roller 63 will not coat the suction drum 62 with adhesive when no band 60 is fed to the drum 62. This also prevents the soiling of the drum 44 with adhesive.

The entire machine is driven, for instance, by an electric motor 100, shown in Figs. 1 and 2, which drives suitably arranged endless drive belts and pulleys.

What we claim is:

1. A machine for the manufacture of filter mouth piece cigarettes, including a cutting device conveyor means for feeding filter rods having lengths which are a multiple of the length of a filter mouth piece lengthwise toward said cutting device, abutment means for arresting the movement of said filter rods at a distance from said cutting device twice the length of the filter mouth piece, means for causing said cutting device to cut from said filter rods a filter rod piece twice the length of said filter mouth piece, said means being constructed to skip a cutting operation on each one of the last portion of the filter rods when said portion has been advanced by the following filter rod toward and in engagement with said abutment means, and a rotary drum having axially extending grooves on its circumference for receiving the filter rod pieces severed from said filter rods and removing them laterally with respect to their longitudinal direction away from said cutting device.

2. A machine for the manufacture of filter mouth piece cigarettes, including a cutting device conveyor means for feeding filter rods having lengths which are a multiple of the length of a filter mouth piece lengthwise toward said cutting device, abutment means for arresting the movement of said filter rods at a distance from said cutting device twice the length of the filter mouth piece, means for causing said cutting device to cut from said filter rods a filter rod piece twice the length of said filter mouth piece, said means being constructed to skip a cutting operation on each one of the last portion of the filter rods when said portion has been advanced by the following filter rod toward and in engagement with said abutment means, a rotary drum having axially extending grooves on its circumference for receiving the filter rod pieces severed from said filter rods and removing them laterally with respect to their longitudinal direction away from said cutting device, a second rotary drum having axial grooves on its circumference, means for operatively connecting said two drums and driving means for rotating the same simultaneously, means for placing two cigarette rods of predetermined length into the grooves of said second rotary drum in axial alignment and axially spaced relation, said first mentioned drum being connected with said second drum in such a manner to deposit the filter rod pieces into the space between the two cigarette rods on said second drum during the rotation of said drums.

3. A machine according to claim 1, including a container for a supply of filter rods, a channel extending downwardly from said container and permitting the passage of one filter rod at a time, means for engaging one end of the lowest filter rod in said channel and removing said rod lengthwise therefrom and transferring it to said conveyor means for feeding toward said cutting device.

4. A machine according to claim 1, in which said conveyor means comprises an endless conveyor belt having an upper horizontal run for receiving and feeding the filter rods toward said cutting device, and means engaging the upper side of the filter rods on said horizontal run of the conveyor belt and urging said filter rods against said conveyor belt, and driving means for operating said conveyor belt and means engaging said filter rods.

5. A machine according to claim 1, in which said cutting device includes a fixedly mounted sun gear, a rotatable carrier rotating about the axis of said sun gear, rotatable shafts mounted on said carrier, a planetary gear fixed on each said shafts and meshing with said sun gear, and circular knives fixed on said shafts and adapted to be moved in cutting relation with the filter rods fed by said conveyor means when said carrier is rotated, means for rotating said carrier.

6. A machine for the manufacture of filter mouth piece cigarettes, including a cutting device conveyor means for feeding filter rods having lengths which are a multiple of the length of a filter mouth piece lengthwise toward said cutting device, abutment means for arresting the movement of said filter rods at a distance from said cutting device twice the length of the filter mouth piece, means for causing said cutting device to cut from said filter rods a filter rod piece twice the length of said filter mouth piece, said means being constructed to skip a cutting operation on each one of the last portion of the filter rods when said portion has been advanced by the following filter rod toward and in engagement with said abutment means, and a rotary drum having axially extending grooves on its circumference for receiving the filter rod pieces severed from said filter rods and removing them laterally with respect to their longitudinal direction away from said cutting device, a cover plate arranged concentrically about a portion of the drum which receives and conveys the filter rod pieces laterally away from the cutting device, and resilient means on said cover plate to engage the filter rod pieces on said drum and positioning the same uniformly and straight in the grooves of said drum.

7. A machine according to claim 2, including means arranged adjacent both ends of said second rotary drum for engaging the outer ends of the cigarette rods and filter rod piece assemblages in the grooves of said drum for pushing the cigarette rods axially in abutting engagement with the ends of the filter rod piece therebetween.

8. A machine according to claim 2, including stationary guide plates arranged adjacent both ends of said second rotary drum for engaging the outer ends of the cigarette rods and filter rod piece assemblages in the grooves of said drum for pushing the cigarette rods axially in abutting engagement with the ends of the filter rod piece therebetween.

9. A machine according to claim 2, including an annular disc mounted in axial spaced relation on each end of said second drum, resilient means for urging said annular discs away from said ends of the drum and means including pivotally mounted lever arms for urging said annular disc toward that portion of the end walls of the drum from which the outer ends of the cigarette rods are projecting, whereby said annular discs engage said cigarette rods and push the same axially against the ends of the filter rod piece placed between said cigarette rods.

10. A machine according to claim 2, including a third rotary drum, means for driving said three drums in unison, said third drum having mounted thereon pairs of gripper jaws, a semi-circular groove being formed between each two jaws of a pair for receiving a cigarette rod-filter rod piece assemblage from said second drum, suction means in said third rotary drum to hold the filter rod piece in position in addition to said gripper jaws, and means for feeding a uniting bands to each assemblage on said third drum.

11. A machine according to claim 2, including a third rotary drum, means for driving said three drums in unison, said third drum having mounted thereon pairs of gripper jaws, a semi-circular groove being formed between each two jaws of a pair for receiving a cigarette rod-filter rod piece assemblage from said second drum, suction means in said third rotary drum to hold the filter rod piece in position in addition to said gripper jaws, and means for feeding a uniting bands to each assemblage on said third drum, said last named feeding means including a fourth rotary drum, means on said fourth drum for supporting individual uniting bands thereon, which latter are provided on one side with an adhesive engaging said assemblages and moving with the latter, and means for wrapping said uniting band around said assemblage during the rotation of said drums.

12. A machine according to claim 2, including a third rotary drum, means for driving said three drums in unison, said third drum having mounted thereon pairs of gripper jaws, a semi-circular groove being formed between each two jaws of a pair for receiving a cigarette rod-filter rod piece assemblage from said second drum, suction means in said third rotary drum to hold the filter rod piece in position in addition to said gripper jaws, and means for feeding a uniting bands to each assemblage on said third drum, the gripper jaw portions engaging the cigarette rods having gripper ends extending outwardly beyond the circumference of the cigarette rods.

13. A machine according to claim 10, in which said feeding means includes a supply spool containing a continuous band, means for conducting said continuous band to a cutting mechanism for cutting individual uniting bands from said continuous band, and means for applying a coating of an adhesive to one side of said uniting bands before the latter are brought into engagement with the assemblages on said third drum.

14. A machine according to claim 10, in which said feeding means includes a supply spool containing a continuous band, means for conducting said band to a perforating mechanism for weakening the continuous band along transverse lines spaced apart a distance equal to the desired length of an individual uniting band, means for applying an adhesive to one side of said perforated band, and means for an assemblage to said perforated band and at the same time severing the uniting band engaged by said assemblage along the weakened transverse line from the continuous band.

15. A machine according to claim 2, including a third rotary drum, means for driving said three drums in unison, said third drum having mounted thereon pairs of gripper jaws, a semi-circular groove being formed between each two jaws of a pair for receiving a cigarette rod-filter rod piece assemblage from said second drum, suction means in said third rotary drum to hold the filter rod piece in position in addition to said gripper jaws, and means for feeding a uniting band to each assemblage on said third drum, said last named feeding means including a fourth rotary drum, means on said fourth drum for supporting individual uniting bands thereon, which latter are provided on one side with an adhesive, means in said drum for producing jets of compressed air for lifting the individual uniting bands off the surface of said fourth drum to cause said uniting band to engage said assemblages and moving with the latter, and means for wrapping said uniting band around said assemblage during the rotation of said drums.

16. A machine according to claim 2, including a third rotary drum, means for driving said three drums in unison, said third drum having mounted thereon pairs of gripper jaws, a semi-circular groove being formed between each two jaws of a pair for receiving a cigarette rod-filter rod piece assemblage from said second drum, suction means in said third rotary drum to hold the filter rod piece in position in addition to said gripper jaws, and means for feeding a uniting bands to each assemblage on said third drum, said last named feeding means including a fourth rotary suction drum provided on its circumference with flat supporting bars against which individual uniting bands are held by suction, said bands having their side facing away from the circumference of said fourth drum provided with an adhesive which engages the assemblage transferred to said uniting band by said third rotary drum when the gripper jaws on the latter are opened, stationary cam means, pivoted levers on at least one of said gripper jaws of each pair operated by said cam means to close and open said gripper jaws, and means admitting compressed air to the opened gripper jaws for assisting the transfer of the assemblages from said third drum to the adhesive coating on the uniting bands supported on said fourth drum.

No references cited.